United States Patent Office

3,492,847
Patented Feb. 3, 1970

3,492,847
DEVICE FOR CONTROLLING THE PRESSING FORCE OF AN ULTRASONIC TOOL AGAINST AN ARTICLE BEING MACHINED
Alexandr Alexandrovich Ustyantsev, Ulitsa Vavilova 44, korpus 4, and Boris Khaimovich Mechetner, Leningradsky prospekt 27, kv. 69, both of Moscow, U.S.S.R.
Filed Dec. 6, 1966, Ser. No. 599,550
Int. Cl. B21b 37/08
U.S. Cl. 72—21                                             3 Claims

ABSTRACT OF THE DISCLOSURE

A device which controls the pressing force of an ultrasonic tool against an article being machined comprises a counterweight disposed on a rocker for displacement to adjust the pressing force of the tool, the counterweight being swingably mounted on a carriage which is displaced along the rocker by a motor carried thereby, the carriage carrying a movable contact of a potentiometer which is fed with constant voltage and which is disposed alongside the rocker and is connected to an indicator device which indicates the value of the counter balancing moment of the load as related to the position of the counterweight on the rocker.

---

The present invention relates to devices for controlling the force with which an ultrasonic tool is pressed against an article being worked in machines for ultrasonic working of articles.

Now in use is a device for controlling the force with which the ultrasonic tool is pressed against the article being worked, which is fitted with a load-counterweight disposed on a rocker to provide for the force with which the tool is pressed to the article being worked.

Disadvantages of the known devices for controlling the force of pressing reside in the fact that the devices have large overall dimensions and, besides, a great amount of copper is consumed on windings of control elements, e.g. solenoids, which considerably increase with an increase of the force of pressing the tool and, consequently, of the range of control.

An object of the invention is to provide a device for controlling the force with which an ultrasonic tool is pressed against an article being worked, said device having a wide range of control over the force of pressing.

Another object of the invention is to decrease the overall dimensions and the consumption of copper in the electrical circuit of the device.

In the accomplishment of the above and other objects of the invention, a device thereof for controlling the force with which an ultrasonic tool is pressed against an article being worked incorporates a mechanism for displacing a load-counterweight along a rocker, and a potentiometer disposed alongside the rocker, whose movable contact is fastened to said mechanism.

It is appropriate to fashion the mechanism for the displacement of the load-counterweight along the rocker as a carriage with bearings fixed on the latter.

Figure 3:
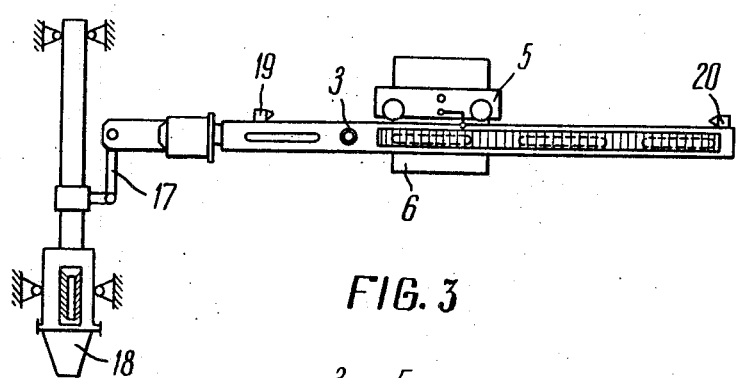
Figure 1:
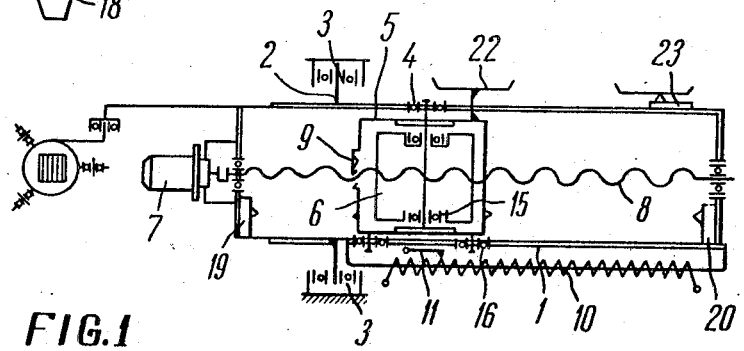
Figure 2:
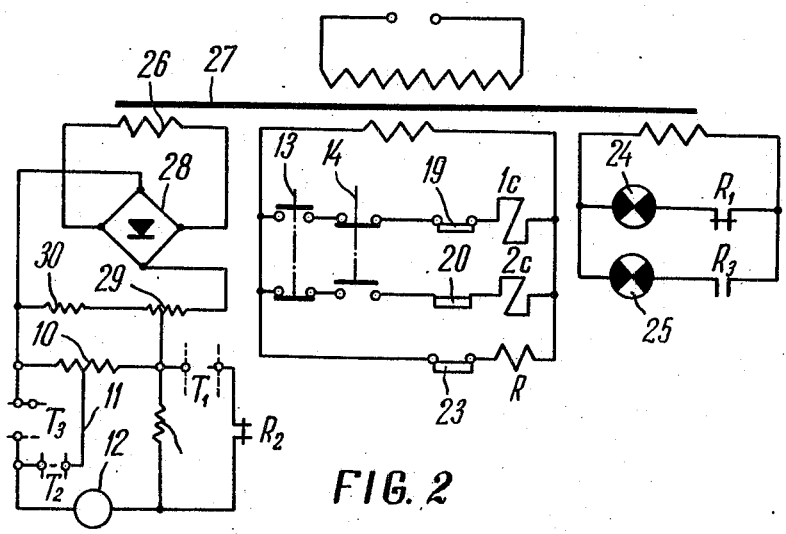

Other objects and advantages of the invention will become more apparent upon consideration of an exemplary embodiment thereof taken with reference to the accompanying drawing, wherein:

FIG. 1 diagrammatically illustrates in plan view the device according to the invention for controlling the force of pressing of the tool;

FIG. 2 is an electrical circuit of the control of the device according to the invention; and FIG. 3 is a side elevation view of the device of FIG. 1.

The device to control the force with which the ultrasonic tool is pressed against the article in the process of working is fashioned as a rocker 1 (FIG. 1) in the form of a rectangular frame swinging on two half axles 2 in ball bearings 3.

The mechanism for displacing loads travels on roller bearings 4 along the rocker 1 and consists of a carriage 5 with a swinging load 6 serving as the counterweight. Displacement of the carriage 5 is effected by an electric motor 7 by means of a screw 8 and a nut 9 fastened in the carriage 5.

Installed alongside the rocker is a potentiometer 10 from which the signal is taken by a movable contact 11, said signal being transmitted to an instrument 12 (FIG. 2) and indicated thereon. The value of the signal corresponds to the balancing moment of the load-counterweight 6 (FIG. 1) providing a certain force with which the tool is pressed against the article.

Control over the pressing force is effected in accordance with the electrical circuit given in FIG. 2. Pressing a button 13 or 14 causes starting of the electric motor 7 which, by means of the screw 8 via the nut 9, displaces the carriage 5 with the swinging load 6 suspended to supports 15. The supports 15 provide for constant vertical position of the flat counterweight 6, owing to which the projection of the center of gravity of counterweight 6 on the horizontal plane of the arm practically does not change; this maintains the established value of the operating force of pressing during machining the article irrespective of the angle of incline of the arms of rocker 1 coupled with spindle 18. The carriage 5 slides freely on bearings 16 along the guides of the rocker 1 which is connected with the aid of a connecting link 17 to a spindle 18 of the machine. The carriage 5 travels on a roller bearing 4 and two roller bearings 16, the bearings 16 having additional rings which, by their outer shape, determine the direction of travel of carriage 5 along rocker 1. Displacement of loads 6 along the guides of the rocker 1 is limited by end switches 19 and 20 connected in series with the starting buttons 13 and 14 and respective contactors 1c, 2c for motor 7.

Control over the value of the force of pressing the tool is effected by the instrument 12 (FIG. 2); the value of the signal entering the latter changes depending upon the position of the movable contact 11 on the potentiometer 10 which is fed by standard voltage.

To assist the reading thereof, the instrument 12 is provided with two scales (high and low operating ranges) and the switching from one scale to the other is effected automatically during the travel of carriage 5 with swinging counterweight 6. Which of the ranges is operative is indicated by lighting of the corresponding lamp 24 or 25.

This part of the device operates in the following manner:

The pressure of the ultrasonic tool is gradually increased when carriage 5 travels from the right end position on the guiding rocker 1 to the left. When the carriage reaches a certain position, cam 22 mounted on the carriage opens microswitch 23 which in its normally closed condition energizes winding R of the intermediate relay. The normally closed contacts $R_1$ and $R_2$ are opened, and the normally opened contact $R_3$ is closed. Lamp 24 is extinguished and lamp 25 will light up indicating that the scales are changed. When the scales are changed, contact $R_2$ is opened and includes resistor 21 into the circuit of instrument 12 whose pointer is returned to the zero left position.

During this time, contacts $T_1$ and $T_2$ of the tumbler switch are presumed to be closed and contact $T_3$ opened. If the position of the tumbler switch is so chosen that contacts $T_1$ and $T_2$ are opened and contact $T_3$ is closed, then the voltage from rectifying circuit 28 is applied to instrument 12 after being lowered by resistor 29. The voltage applied to instrument 12 can be set by adjusting resistor 29.

When the tumbler switch is returned to its initial position, the thus adjusted voltage is applied to potentiometer 10.

The resistors 30 and 29 serve for coarse and fine adjustment of the standard voltage, respectively.

Potentiometer 10 and the instrument are fed from a secondary winding 26 of the power transformer 27 via a diode rectifying circuit 28.

Adjustment and control of the force of pressing can be effected without stopping the working process.

Although the present invention has been described with reference to the preferred embodiment thereof, it is understood that various modifications and alterations can be made without departing from the spirit and scope of the invention as those skilled in the art will easily understand.

We claim:

1. A device for controlling the force with which a tool is pressed against an article, said device comprising: a rocker; a load-counterweight, disposed on said rocker to provide for the force of pressing of the tool; a mechanism for displacing said load along said rocker; a potentiometer fed with constant voltage disposed alongside said rocker, said potentiometer having a movable contact fastened to said mechanism for providing a measure of the position of the counterweight on the rocker; and an indicator device connected to said potentiometer to indicate the value of the counter balancing moment of the load as related to the position of the counterweight on the rocker.

2. A device as claimed in claim 1 in which the mechanism for displacing the load-counterweight along said rocker comprises a carriage with bearings fixed to the latter, said counterweight being swingably supported on said bearings.

3. A device as claimed in claim 1 wherein said indicator device has first and second operating ranges, and means on said mechanism for changing the ranges of the indicator device when the counterweight reaches a predetermined position on the rocker.

References Cited

UNITED STATES PATENTS

| | | | |
|---|---|---|---|
| 166,785 | 8/1875 | Klinkermann | 248—364 |
| 2,597,337 | 5/1952 | Kershaw | 248—123 |
| 3,314,582 | 4/1967 | Haigler | 228—1 |

CHARLES W. LANHAM, Primary Examiner

G. P. CROSBY, Assistant Examiner

U.S. Cl. X.R.

72—429; 228—1; 248—123, 292, 364